United States Patent [19]

Douden

[11] Patent Number: 4,769,189
[45] Date of Patent: Sep. 6, 1988

[54] PROCESS FOR MAKING HOLLOW, CERAMIC SPHEROIDS

[75] Inventor: David K. Douden, St. Paul, Minn.

[73] Assignee: Minnesota Mining and Manufacturing Company, Saint Paul, Minn.

[21] Appl. No.: 940,795

[22] Filed: Dec. 12, 1986

Related U.S. Application Data

[62] Division of Ser. No. 787,628, Oct. 15, 1985, Pat. No. 4,657,810.

[51] Int. Cl.$^4$ .............................................. B29B 9/12
[52] U.S. Cl. ........................................ 264/15; 264/43
[58] Field of Search ................................. 264/43, 15

[56] References Cited

U.S. PATENT DOCUMENTS

| | | | |
|---|---|---|---|
| 1,842,186 | 1/1932 | McBerty | 264/43 |
| 2,553,759 | 5/1951 | Geiger | 25/156 |
| 3,150,989 | 9/1964 | Parsons | 264/43 |
| 3,273,962 | 9/1966 | Walsh | 23/140 |
| 3,365,315 | 1/1968 | Beck et al. | 106/40 |
| 3,619,435 | 11/1971 | Kepper | 264/43 |
| 3,666,506 | 5/1972 | Cowan et al. | 106/41 |
| 3,792,136 | 2/1974 | Schmitt | 264/44 |
| 3,875,271 | 4/1975 | Martin | 264/43 |
| 3,875,272 | 4/1975 | Martin | 264/43 |
| 3,875,273 | 4/1975 | Martin | 264/43 |
| 3,960,583 | 6/1976 | Netting et al. | 106/122 |
| 4,039,480 | 8/1977 | Watson et al. | 252/455 R |
| 4,111,713 | 9/1978 | Beck | 106/288 B |
| 4,118,450 | 10/1978 | Nakamura et al. | 264/43 |
| 4,393,901 | 7/1983 | Beck | 138/145 |

FOREIGN PATENT DOCUMENTS

43-28713  5/1968  Japan ..................................... 264/43

*Primary Examiner*—Jan H. Silbaugh
*Assistant Examiner*—Karen D. Kutach
*Attorney, Agent, or Firm*—Donald M. Sell; Douglas B. Little

[57] ABSTRACT

Process for making hollow, ceramic macrospheres by making a paste of a continuous phase material (e.g., sodium silicate or potassium silicate) and an insolubilizing agent (e.g., kaolin clay). Pellets are formed from the paste and expanded by subjection to heat to form hollow spheroids. The spheroids are fired at a temperature (typically 600°–1000° C.) and for a time sufficient to insolubilize the continuous phase material. The process may further include coating the fired spheroids with an epoxy resin (to reduce porosity) and/or bonding a plurality of the fired spheroids together to form a rigid mass of bonded spheroids.

9 Claims, 1 Drawing Sheet

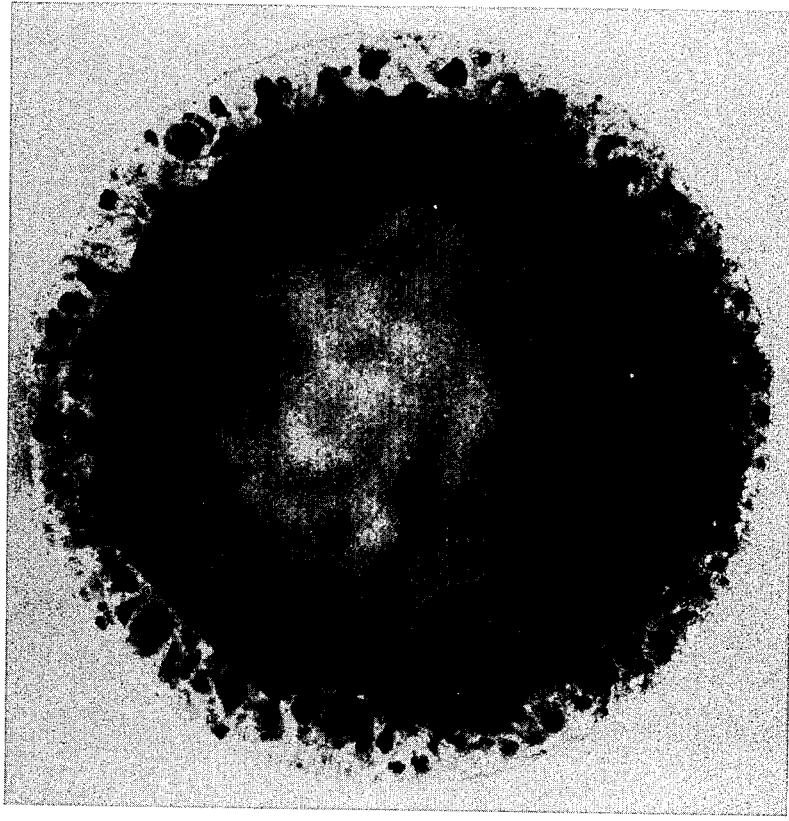

PROCESS FOR MAKING HOLLOW, CERAMIC SPHEROIDS

This is a division of application Ser. No. 787,628, filed Oct. 15, 1985, now U.S. Pat. No. 4,657,810.

TECHNICAL FIELD

This invention pertains to the field of hollow, inorganic, fired spheroids which are useful for, among other things, fillers in concrete.

BACKGROUND

There is a need for hollow ceramic spheroids with controlled porosity for use as fillers in certain concrete applications. One application for concrete containing such a filler is the concrete which surrounds pipe sections used for gas pipelines in the ocean. Such pipe sections comprise a metal core pipe covered with a concrete shell. Hollow, porous spheroids within the concrete would initially allow the pipeline to weigh less than such pipe without the hollow filler, but with the passage of time, water permeating into the porous hollow spheroids in the concrete would increase the weight of the pipeline, making it rest stably on the ocean bottom after it had been assembled and installed. For such applications, it is desirable to have hollow spheroids whose porosity and strength remain relatively stable so that the performance of the concrete around the pipeline is predictable.

Other potential uses for hollow fired spheroids are in the formation of low density syntactic bodies with high temperature strength. Such syntactic bodies may be useful as heat resistant insulation. Syntactic foams are also useful as flotation materials for off-shore drilling rigs and other water-borne vessels.

There are a number of patents on the subject of hollow, ceramic spheroids, sometimes called macrospheres to differentiate them over microspheres (macrospheres being generally larger than 500 micrometers in diameter while microspheres are generally less than that dimension). The Beck macrospheres of U.S. Pat. Nos. 4,111,713 and 4,393,901 are made by combining a binder material and a particulate parting agent (e.g. hollow glass microspheres). A void-forming agent is included in the binder and causes the formation of the hollow center of the Beck macrospheres during their manufacture.

There are also known processes for making spheroids by coating small globules or impregnating particles of some combustible material (e.g. a plastic resin or wood flour) with a ceramic material, decomposing the combustible organic, and firing the ceramic shell, see, e.g. U.S. Pat. Nos. 2,553,759; 4,039,480 and 3,792,136.

DISCLOSURE OF INVENTION

Hollow spheroids made by a new process and having a unique structure have been developed, offering the distinct advantage of lower manufacturing cost which greatly expands the utility of inorganic macrospheres. The inventive spheroid is summarized as a fired, hollow spheroid comprising:

A. a continuous phase made of a material selected from the group consisting of aluminum phosphate (AlPO$_4$), sodium silicate (Na$_2$Ox$_1$SiO$_2$) and potassium silicate (K$_2$Ox$_2$SiO$_2$); and B. an insolubilizing agent, which combines with the continuous phase during firing to make the continuous phase insoluble in water;

said fired, hollow spheroid having a cellular shell.

$x_1$ is the molar ratio of silica (SiO$_2$) to soda (Na$_2$O), and $x_2$ is the molar ratio of silica to potassium oxide (K$_2$O).

The inventive spheroids are typically in the range of about 2 to 20 mm diameter with densities of about 0.1 to 1.2 g/cc., and they are stable to at least 400° C. As noted, the shell of the spheroids is cellular, and it can be made from inexpensive raw materials such as sodium silicate (continuous phase) and clay (insolubilizing agent).

Typically, the inventive spheroids are made by mixing sodium silicate with clay (e.g., hydrated Kaolinite) to form a pliable, plastic mass or paste. This mass is formed into pellets ranging from about 2 to 10 mm in size. These pellets are expanded to from 1.5 to 2.0 times their original size by heating (e.g. 150°–200° C.), often in the presence of a parting agent. The expanded pellets which have now taken on a spheroidal shape are further heated or fired to 400° C. in a furnace during which the clay reacts with the sodium silicate to make it insoluble in water.

BRIEF DESCRIPTION OF THE FIGURE

The FIGURE is a photomicrograph (magnified 18×) of a cross-section of a spheroid of this invention. It clearly shows the hollow interior and the cellular shell.

DETAILED DESCRIPTION

Since the shell of the inventive spheroid has at least some porosity, density measurement by fluid displacement methods is not feasible. Density has been measured by measuring either the diameter of a number of spheroids, calculating their volume, or finding volume by the displacement of 40 mesh (425 micrometer) glass beads, and dividing their weight by the volume. When the shells are sealed by an epoxy sealant and volume is determined by a pycnometer, there has been good agreement with the volumes determined by the above described methods. The best flexibility in formulating the spheroids exists in the density range of 0.3 to 0.5 g/cc.

The invention will be further clarified by a consideration of the following examples which are intended to be purely exemplary.

EXAMPLE I 20 grams of a 37.6 weight percent sodium silicate ($x_1$ = 3.22) solution in water was mixed with 10 g kaolin clay (obtained as B-3 clay from Cyprus Minerals Co.), and the mixture was concentrated to 42% sodium silicate solids to form a plastic mass. Pellets 2–10 mm in diameter were formed by hand from the plastic mass, and the pellets were dropped, a few at a time, into a 300 ml beaker containing a mass of 40 mesh (425 micrometer) glass beads. The quantity of glass beads were such that they reached a height of about 1 centimeter in the beaker when it was at rest. The beaker, containing the mass of glass beads as a parting agent and heat transfer medium, was swirled and the mass of beads was maintained at about 130°–150° C. on a hot plate while the pellets were dropped into the beaker. The bed of glass beads may be maintained at temperatures up to about 200° C. The pellets expanded rapidly to form hollow spheroids in about 1½ to 2 minutes, and they were maintained in the heated beaker for about another 2 to 3 minutes to set the spheroids. Next, the spheroids were heated to 400° C. in a furnace to form the inert inventive product. The product may be fired to 800°–1250° C. to generate vitreous phases. The product of this example had a calculated specific gravity in the range of 0.3 to 0.5.

EXAMPLE II 20 g of the same sodium silicate used in Example I was concentrated to about 42 weight percent solids (18 g total weight) and mixed with 10 g of the same clay as used in Example I with a mechanical mixer to form a paste which was subsequently formed into spheroids by hand, as in Example I. After formation of the hollow spheroids in the bed of glass beads, the spheroids formed were a pale tan color, had a diameter of about 6–7 mm, a hard, smooth outer skin and a cellular shell surrounding the hollow center. The shell had pores and was soluble (i.e. the silicate portion) in water. The density of the spheroids, at this point, was about 0.3–0.4 g/cc. These spheroids may be heated to 400° C. for 4–6 minutes and rendered water insoluble; however, they are still weakened by water leaching after 2–3 weeks of exposure to water. If the spheroids were fired at 600° C. for 4–6 minutes, the resultant product shows little leaching or loss of strength after 5 weeks of water exposure; however, the initial spheroid crush resistance is reduced by this higher temperature firing. If the spheroids are heated to 800° C. some fusion of component materials occurs and a vitrified structure is produced.

In the above-described process, typical composition ranges are:
weight percent water in the paste: 35–45%
weight ratio of $SiO_2:Na_2O$: 2.75–3.65
weight ratio of silicate solids to clay: 0.8–3

The effect of the latter two variables on product density is as follows:
as $SiO_2:Na_2O$ ratio increases, density increases; and
as the ratio of silicate solids to clay increases, density decreases.

For potassium silicates, the ratio $x_2$ is typically in the range 2.5–4.

The ratio of sodium silicate to clay has been varied through a range of about 1:1 to 5:1. At the lower ratios, dense spheroids (specific gravity of 0.6 to 0.8) of high strength are formed. At the higher ratios, rather low density (specific gravity of 0.1 to 0.5) spheroids are formed which are weak and somewhat irregular in shape.

Various silicates have been elevated at 0.75 parts by weight silicate solids to one part of clay (of the type used in Example I). Blends of the sodium silicate of Example I and another grade of sodium silicate having a ratio of $SiO_2$ to $Na_2O$ of about 3.85 have been tried, and these experiments have led to the implication that the maximum $SiO_2:Na_2O$ ratio usable is about 3.7. At higher ratios, the shell develops little or no porosity, and the spheroids explode on expansion. Ratios below about 3.0 can lead to excessive pore sizes. Blends of the sodium silicate of Example I with potassium silicate having a ratio $x_2$ of about 3.29 have been evaluated and have shown a slight improvement in long term water stability after firing at 600° C. in addition to higher initial strength.

Both Dover and No. 1 Peerless kaolin clays (obtained from R. E. Carrol Co. and R. T. Vanderbilt Co. respectively) have been used in direct substitution for the B-3 kaolin clay of Example I. Products made with these alternative clays were about equal in density and stability in water after firing at 600° C., but the product made with Dover clay showed better spheroid strength.

Other insolubilizing agents which can be used instead of clay are: iron oxide, titanium dioxide, alumina trihydrate ($Al_2O_3.3H_2O$) and zinc oxide. Spheroids made with these compounds should be fired at temperatures of at least 600° C., generally in the range of 600° to 1000° C.

EXAMPLE III 2.5 g of the same sodium silicate used in Example I (concentrated to about 41% solids) were mixed with 0.6 g of iron oxide ($Fe_2O_3$) reagent grade and 0.2 g of ground silica (less than 75 micrometer particle size) to form a uniform paste. Spheroidal pellets about 4 mm in diameter were formed by hand from this paste. The paste pellets were heated in a rotating bowl over a laboratory burner. The resulting expanded spheroids had a diameter of about 6–7 mm and a specific gravity of about 0.39. These unfired spheroids were placed in an electrically heated furnace at 675° C. for 10 minutes which the furnace was allowed to cool to 550° C. over a 10–12 minute period before removing the spheroids. The resulting fired spheroids had a diameter of about 7–8 mm, a specific gravity of about 0.26 and were reddish in color. A powdered material such as talc or clay is useful in preventing the spheroids from sticking together during the firing step.

EXAMPLE IV 1.8 g of the 41% solids sodium silicate of the previous example were mixed with 1.3 g of alumina trihydrate (less than 150 micrometers sieve size) and 0.3 g of very fine alumina trihydrate powder (about 1 micrometer particle size) to form a uniform paste. Spheroidal pellets about 4 mm in diameter were formed from the paste by hand. These pellets were expanded by the same method used in Example III resulting in hollow spheroids about 6 mm in diameter and having a specific gravity of about 0.5. These hollow spheroids were fired by placing them in an oven which was raised from 675° C. to 1100° C. over a 30 minute period, held at 1100° C. for 10 minutes, and then allowed to cool down to about 1000° C. at which time the spheroids were removed. The resulting fired spheroids had a specific gravity of about 0.44 and were white.

Various reactive additives have been used together with clay and silicate, the results being shown in the table which follows, in which all numerical values are grams, unless otherwise stated:

| Reactive Additive | Sodium Silicate* (42% Solids) | Clay* | Reactive Additive | Result |
| --- | --- | --- | --- | --- |
| $H_3BO_3$ | 20 | 10.0 | 1.3 | Poor expansion, poor spheroids |
| $CaSO_4$ | 20 | 10.0 | 1.0 | Gelled before expanded poor spheroids |
| MgO | 10 | 4.0 | 1.0 | High density |

-continued

| Reactive Additive | Sodium Silicate* (42% Solids) | Clay* | Reactive Additive | Result |
|---|---|---|---|---|
| $CaCO_3$ | 10 | 4.0 | 1.0 | High density |
| $Na_2B_4O_7$ | 2 | 1.0 | 0.2 | High density |
| $Ca_3(PO_4)_2$ | 3 | 1.5 | 0.3 | Good spheroids |
| $Al(OH)_3$ <1 um | 8 | 2.0 | 1.0 | High density |
| $Al(OH)_3$ <30 um | 4 | — | 3.5 | Rough, high density |
| $Ca(BO_2)_2$ | 2 | 1.0 | .2 | Gelled before expansion poor spheroids |
| ZnO | 2 | 1.0 | .2 | High density |
| $Mg_2OCl_2$ | 50 (S-35) | 7.0 | 7.4 | High density |

*same as used in Example I, except silicate used with magnesium oxychloride had $x_1$ of 3.65 and was obtained as S-35 silicate from Philadelphia Quartz Company.

Of the above listed material, $Ca_3(PO_4)_2$ was the most promising. Strong, inert spheres were produced from a batch fired at 400° C.; however, a batch fired at 600° C. was more easily leached and demonstrated poor strength after 5 weeks of exposure to water than control samples made without reactive additives.

In addition to the reactive additives, various inert fillers have also been utilized, representative examples being listed below along with the their effect on the spheroids.

| Inert Filler | Silicate* (Concentrated to 42% Solids) (g) | Clay* (g) | Inert Filler (g) | Spheroid Density | Remarks |
|---|---|---|---|---|---|
| Glass Microspheres | 3 | 1.0 | 0.4 | | Rough, weak, heavy |
| <75 μm Silica (ground sand) | 18 | 7.0 | 4.5 | 0.42 | Rough, strong, heavy, hard |
| <45 μm Silica (ground sand) | 18 | 10.0 | 3.0 | 0.46 | Strong, heavy hard |
| Talc | 18 | 4.5 | 1.5 | 0.19 | Smooth, weak, light |
| Titanium Dioxide | 2 | — | 1.0 | 0.58 | Smooth, white, heavy |
| Aluminum flake | 2 | 1.0 | 0.1 Est | 0.50 | Smooth, grey, heavy |

*same as used in Example I

In general, coarse inert fillers increase strength and density of the spheroids; while, very fine (1 micrometer or less) inert fillers thicken the paste and retard expansion.

The paste preparation can be carried out either by mixing the raw materials as received and concentrating to an appropriate solids concentration, or by first concentrating the silicate (e.g., to 40–42 weight percent solids) and then mixing the clay. The latter procedure requires a more difficult mixing step, but considerably simplifies the elimination of water.

Expansion of the paste pellets may be done without the parting agent previously described; however, temperature control becomes more difficult. The parting agent is more desirable with tacky paste pellets. An alternative to the glass bead parting agent is to dust the paste pellets with talc.

Expansion may be carried out in a rotating stainless steel bowl, inclined to simulate a commercial balling pan, and heated with a gas burner. Visually, the time required for forming a skin and expansion of the pellets into spheroids is about 15 seconds to 1 minute, with about 2 minutes needed for dehydration.

The porosity of the inventive spheroids can be controlled. One method for controlling porosity is through varying the quantity and particle size of inert filler used. The inert filler is added to the mixture of continuous phase raw material (e.g., sodium silicate) and insolubilizing agent (e.g., clay) before the expansion step.

The unfired paste particles which are fed to the expansion step need not be sphercial. Other shapes which may be used are cylinders, discs, or rough spheroids. For example, the paste may actually be rolled into a slab 3 mm thick, and a cork borer used to cut 4 mm diameter cylinders from the slab. These small cylinders expand satisfactorily to actually form hollow spheroids about 6–8 mm in diameter.

The inventive spheroids may be coated with an impervious coating, such as a two-part epoxy resin system, to eliminate porosity. Typically, 2 to 10 weight percent (based on spheroid weight being 100%) of a two-part epoxy is coated on the spheroids by tumbling and/or stirring the spheroids in the liquid epoxy (which may be diluted with a solvent such as toluene), and then curing the epoxy coating with heat while continuing to stir. Talc may be added as a parting agent during the stirring to maintain separation between the spheroids. A similar coating process is taught for hollow spheroids in U.S. Pat. No. 4,393,901 at column 4, line 66—column 5, line 21, which is incorporated herein by reference.

The spheroids may also be coated with a fusible epoxy resin powder by moistening the fired spheroids with a suitable solvent such as toluene or butyl acetate and then tumbling the spheroids in a bed of epoxy resin powder (e.g., Scotchcast #5300 powder made by Minnesota Mining and Manufacturing Company). The spheres coated with the powder would be separated from excess powder by screening and allowed to air dry to eliminate residual solvent. The spheroids, coated with epoxy resin powder, may then be poured into a form and heated to at least 115° C. to cure the resin.

EXAMPLE V

A paste was prepared as in Example I from which balls were formed, and the paste balls were heated in a rolling pan over a laboratory burner, then dried 16 hours at 225° C. in an oven. The diameter of the resulting expanded spheroids ranged from about 5.5 to 7 mm with an average of about 6.25 mm. The specific gravity was calculated to be about 0.37. A sample of the expanded spheroids was placed in an electric furnace at 400° C. and the temperature was increased to 600° C. over 22 minutes. The spheroids were maintained at 600° C. for 5 minutes and then allowed to cool to room temperature. A weight loss of about 10% occurred in this step. The resulting spheroids had the same diameter as before, but specific gravity was reduced to about 0.33. These spheroids were coated with Scotchcast #5 two-part liquid epoxy resin four separate times, each time using an amount of epoxy resin equivalent to 5% of the original spheroid weight and curing the epoxy coating until it was tack free at room temperature. The coating procedure was as discussed previously for two-part epoxy resin systems. After the fourth epoxy resin coat, the product was cured at 135° C. for one hour. At this stage, the spheroids had the same measured diameter as before and a specific gravity of 0.42 determined by calculation and by helium stereopycnometer. The product bulk density was about 0.22 g/cc.

This invention includes within its scope masses comprising a plurality of the hollow ceramic spheriods which have been bonded together at the points of contact between the spheriods in the mass. One method for obtaining such a bonded mass of spheroids is to use the paste from which pellets are formed by diluting the paste (e.g., reduce concentration by 10 weight percent with water) and using the dilute paste as a cement to hold the spheroids together. The spheroids can be coated with the paste cement, placed in contact with each other and dried in an oven (e.g., at 150°-200° C. for ½ hour) and then fired (e.g., at 1100° C. for 10-15 minutes) to produce a rigid, light weight, porous body of bonded spheroids.

A second method for producing such a bonded mass of spheroids is to place a mass of loose spheroids coated with epoxy resin into a form or mold, before the epoxy resin has been cured, so that the spheroids are in contact with each other. This procedure is followed by heating the mass to the temperature at which the epoxy resin will fuse and cure (e.g., higher at 115° C.), to form a low density porous body.

INDUSTRIAL APPLICABILITY

The fired hollow spheroids of this invention have several industrial applications. They may be used in syntactic foams or as porous fillers in the concrete used for pipelines laid in the ocean, as described previously in the Background section. The invention spheroids can be made with just the right degree of permeability at the ocean water pressures which are to be expected for such pipelines.

The inventive spheroids may also be adhered to a base substrate to provide useful products. For example, a dense monolayer of uniformly sized spheroids may be adhered to a porous carrier, such as a scrim cloth, to form a sheet material useful in reinforced synthetic polymeric products. Such a sheet material could be wound around a mandrel in one or more thickness and impregnated with resin to form a pipe. Boat hulls, shower stalls and furniture components may also be made using such a sheet material.

Other embodiments of this invention will be apparent to those skilled in the art from a consideration of this specification or practice of the invention disclosed herein. Various omissions, modifications and changes to the principles described may be made by one skilled in the art without departing from true scope and spirit of the invention which is indicated by the following claims.

What is claimed is:

1. A process for making fired, hollow, ceramic spheroids which comprises the steps of:
   (i) making a paste of the following raw materials:
      (a) a continuous phase material selected from the group consisting of aluminum phosphate, sodium silicate, and potassium silicate; and
      (b) an insolubilizing agent;
   (ii) forming pellets from the paste of step (i);
   (iii) expanding the paste pellets from step (ii) by subjecting them to heat, whereby unfired hollow spheroids are formed; and
   (iv) firing the unfired spheroids at a temperature and for a time sufficient to insolubilize the continuous phase.

2. The process of claim 1 wherein the continuous phase material of step (i) is sodium silicate having the formula $Na_2Ox_1$ $SiO_2$ wherein $x_1$, the molar ratio of $SiO_2$ to $Na_2O$, is between 2.75 and 3.7.

3. The process of claim 1 wherein the expansion step (iii) comprises heating the paste pellets from step (ii) in a rotating vessel containing a parting agent.

4. The process of claim 1 wherein the insolubilizing agent is selected from the group consisting of:
   kaolin clay, provided that step (iv) is conducted at a temperature of between about 400° and 1000° C.,
   iron oxide, titanium dioxide, alumina trihydrate and zinc oxide, provided that the firing temperature of step (iv) is between about 600° and 1000° C. for titanium dioxide, alumina trihydrate and zinc oxide.

5. The process of claim 1 wherein the continuous phase material is a silicate and the insolubilizing agent is kaolin clay and which further comprises including in the paste of step (i) is a reactive additive selected from the group consisting of boric acid, calcium sulfate, magnesium oxide, calcium carbonate, sodium borate, calcium phosphate, alumina trihydrate, calcium borate, zinc oxide and magnesium oxychloride.

6. The process of claim 1 wherein the continuous phase material is a silicate and the insolubilizing agent is kaolin clay and which further comprises including within the raw materials for the paste of step (i) an inert filler selected from the group consisting of glass bubbles, silica powder, talc, titanium dioxide, and aluminum flake.

7. The process of claim 1 which further comprises step (v) coating the fired spheroids with an epoxy resin.

8. The process of claim 1 which further comprises bonding a plurality of the fired spheroids from step (iv) together to form a rigid mass of bonded spheroids.

9. A process for making fired, hollow, ceramic spheroids which comprises the steps of:
   (i) making a paste of the following raw materials:
      (a) a continuous phase material selected from the group consisting of sodium silicate and potassium silicate, and (b) kaolin clay, wherein a weight ratio of silicate solids from part (a) to kaolin clay is between 0.8 and 3;
(ii) forming pellets from the paste of step (i);
(iii) expanding the paste pellets from step (ii) by subjecting them to heat, whereby unfired hollow spheroids are formed; and
(iv) firing the unfired spheroids at a temperature and for a time sufficient to insolubilize the continuous phase.

* * * * *